United States Patent [19]

Yasue et al.

[11] Patent Number: 4,807,497
[45] Date of Patent: Feb. 28, 1989

[54] SYSTEM FOR INTEGRALLY CONTROLLING AUTOMATIC TRANSMISSION AND ENGINE

[75] Inventors: Hideki Yasue; Kagenori Fukumura, both of Toyota, Japan

[73] Assignee: Toyota Jidosha Kabushiki Kaisha, Aichi, Japan

[21] Appl. No.: 60,005

[22] Filed: Jun. 9, 1987

[30] Foreign Application Priority Data

Jun. 16, 1986 [JP] Japan .................................. 61-139431

[51] Int. Cl.⁴ ............................................. B60K 41/04
[52] U.S. Cl. ......................................... 74/867; 74/866
[58] Field of Search ........................... 74/866, 867, 740

[56] References Cited

U.S. PATENT DOCUMENTS

| | | | |
|---|---|---|---|
| 4,266,447 | 5/1981 | Heess et al. | |
| 4,370,903 | 2/1983 | Stroh et al. | |
| 4,403,527 | 9/1983 | Mohl et al. | |
| 4,589,302 | 5/1986 | Oda et al. | 79/877 X |
| 4,610,183 | 9/1986 | Nobumoto et al. | 74/867 X |
| 4,627,311 | 12/1986 | Yokooky et al. | 74/866 |
| 4,648,289 | 3/1987 | Kubo et al. | 74/867 X |
| 4,674,364 | 6/1987 | Shindo et al. | 74/752 A |
| 4,718,310 | 1/1988 | Shindo et al. | 74/869 X |

FOREIGN PATENT DOCUMENTS 55-69738  5/1980  Japan.

*Primary Examiner*—David A. Scherbel
*Assistant Examiner*—Creighton Smith
*Attorney, Agent, or Firm*—Parkhurst, Oliff & Berridge

[57] ABSTRACT

In a system for integrally controlling an automatic transmission and an engine, having a pattern select switch, and wherein engine torque is changed by a predetermined change value to thereby maintain the satisfactory shift characteristics, at least one of an engine torque change performing region and an engine torque change value is corrected in accordance with the state of the pattern select switch. As a result, the optimal engine torque change during shifting can be constantly performed regardless of the operator-selected shift pattern.

5 Claims, 2 Drawing Sheets

SYSTEM FOR INTEGRALLY CONTROLLING AUTOMATIC TRANSMISSION AND ENGINE

BACKGROUND OF THE INVENTION

This invention relates to a system for integrally controlling an automatic transmission and an engine, and more particularly to improvements in a system for integrally controlling an automatic transmission and an engine, wherein the engine torque is temporarily changed by a predetermined value during shifting to maintain satisfactory shift characteristics.

Automatic transmissions comprising gear transmission mechanisms, a plurality of frictionally engaging devices, and hydraulic pressure control devices operated to selectively switch the engagements of the frictionally engaging devices, so that any one of a plurality of gear stages can be achieved in accordance with a present shift map, are well known in the transmission art.

Furthermore, an automatic transmission has heretofore been widely known, wherein two types of shifting patterns are performed in accordance with the aforesaid shift maps: a power pattern (power performance mode) and an economy pattern (fuel consumption performance mode). Running characteristics in compliance with the intention of a driver can be selected.

Furthermore, in an automatic transmission for a vehicle of the type described, various systems have been implemented for integrally controlling an automatic transmission and an engine, wherein engine torque is changed during shifting to obtain satisfactory shift characteristics and durability of the frictionally engaging devices (For example, Japanese Patent Laid-Open No. 69738/1980). More specifically, in such systems the amount of torque transmitted from the engine is changed during shifting and the amount of absorbed energy in various members in the automatic transmission or in the frictionally engaging devices for controlling these members is controlled so as to complete shifting within a short period of time under a low shift shock.

In the above-described system for integrally controlling an automatic transmission and an engine, normally, a change value of engine torque is determined by engine load (throttle opening, for example) and the type of shifting.

However, in the above-described automatic transmission wherein the shift patterns can be selected, even under the same engine load and the same type of shifting, engine rotary speeds during shifting differ with respective shift patterns. As a consequence, the amount of energy absorbed by the frictionally engaging devices differs with respective shift patterns. The torque change value in the automatic transmission has heretofore been determined on the basis of the power pattern in order to secure the durability thereof. Because of this, even if the economy shift pattern is selected (which pattern does not require as high a torque change value), the same torque change as during power shift pattern selection has been performed. As a result, such disadvantages as increased shift shock due to shortened shift time durations and unnecessary increases in temperature in the exhaust system arise.

SUMMARY OF THE INVENTION

The present invention has been developed to obviate the above-described disadvantages of the prior art and has as its object the provision of a system for integrally controlling an automatic transmission and an engine, wherein an optimal engine torque change value in accordance with the selection of a shift pattern is obtained.

As generally shown in FIG. 1, to achieve the above-described object, the present invention is for utilization in systems for integrally controlling an automatic transmission and an engine, of a type provided with a pattern select switch for changing engine torque by a predetermined change value during shifting to thereby maintain satisfactorily shift characteristics.

The present invention determines the performing region of the engine torque change, detects the state of the pattern select switch, and changes or corrects at least one of the engine torque change performing region and the engine torque change value in accordance with the state of the pattern select switch thus detected.

Incidentally, the engine torque change is normally performed only when the throttle opening is greater than a predetermined value. As discussed herein "a performing region" refers to a region where the throttle opening is larger than a predetermined value. In general, it is necessary to perform the engine torque change in a wider region in the case of the power pattern than in the case of the economy pattern.

As a consequence, the optimal performing region of the engine torque change and/or engine torque change value can be obtained in accordance with the state of the pattern select switch, so that the engine torque can be prevented from being improperly changed when, for example, the economy pattern is selected. More specifically, the engine torque change value is not indiscriminately determined on the basis of the power pattern, but in the case of the economy pattern, is determined on the basis of the optimal conditions, set independent of the power pattern. As a result, disadvantages such as deterioration of shift feel due to shortened shift time durations of the automatic transmission and excessive rises in temperature in the exhaust system of the engine are reduced.

In one preferred embodiment of the present invention, the apparatus for correcting at least one of the performing region of the engine torque change and the engine torque change value is apparatus for correcting (changing or selecting) the map of the engine torque change value. With this arrangement, the torque change value can be done easily. Furthermore, if the torque change value is corrected to zero, the performing region is also able to be corrected simultaneously. Namely, to correct the torque change value to zero means to narrow the performing region.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein:

FIG: 1 is a block diagram showing the arrangement of the illustration of the present invention;

FIG. 3 is a flow chart showing an engine torque control routine adopted in the system of the above embodiment; and FIG. 4 is a flow chart showing an engine control routine.

DESCRIPTION OF THE PREFERRED EMBODIMENT

The present invention will be described in detail with reference to the accompanying drawings which illustrate a preferred embodiment of the present invention.

Figure 1:
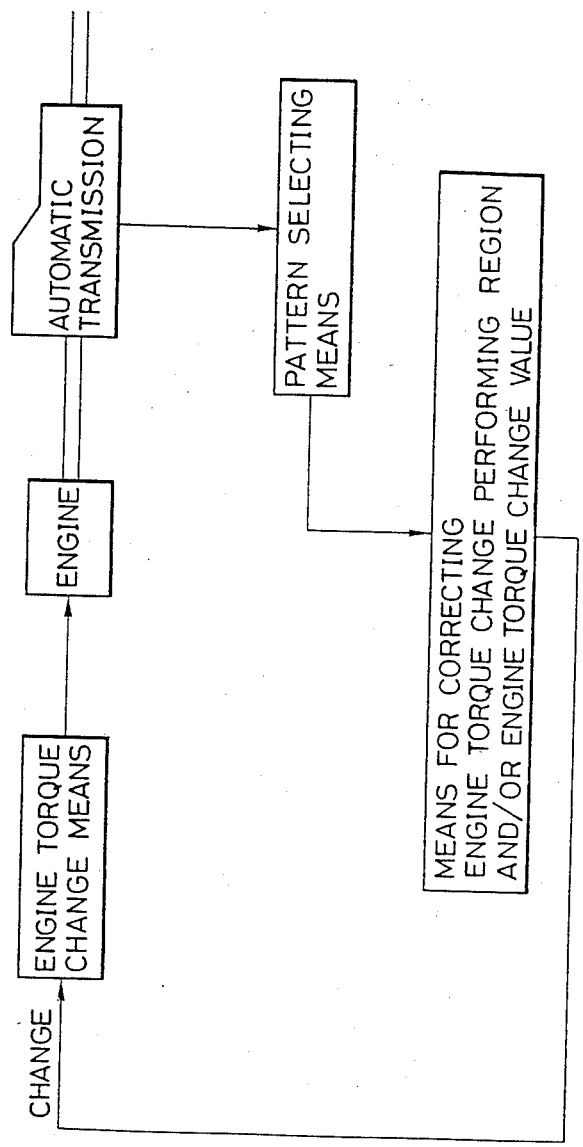
Figure 2:
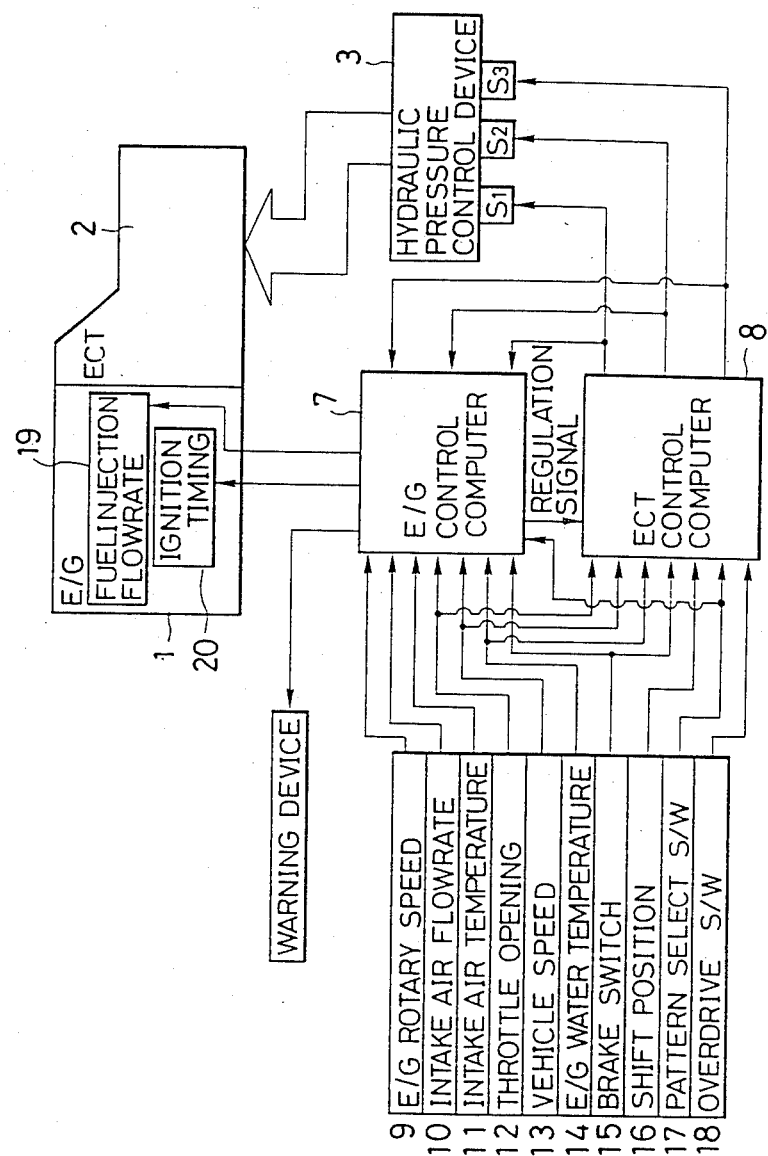
FIG. 2 is a block diagram generally showing the arrangement of one embodiment of the system for integrally controlling an automatic transmission and an engine according to the present invention.

FIG. 2 is a block diagram showing the general arrangement of the system for integrally controlling an automatic transmission and an engine, to which the present invention is applied.

Engine 1 and automatic transmission 2 are of types well-known. In the engine 1 fuel injection flowrate at an injector 19 and an ignition timing at a distributor 20 are controlled by an engine control computer 7, so that engine output in proportion to throttle opening and engine rotary speed can be obtained. In the automatic transmission 2, electromagnetic valves S1-S3 are controlled by an automatic transmission control computer 8 and oil lines in a hydraulic pressure control device 3 are changed whereby the engagements of frictionally engaging devices are selectively changed, so that a gear stage proportional to vehicle speed and accelerator opening can be obtained.

More specifically, the engine control computer 7 receives signals of engine rotary speed from an engine rotary speed sensor (crank angle sensor) 9; intake air flowrate from an air flow meter 10; intake air temperature from an intake air temperature sensor 11; throttle opening from a throttle sensor 12; vehicle speed from a vehicle speed sensor 13; engine water temperature from a water temperature sensor 14; and brake-ON signal from a brake switch 15. The engine control computer 7 determines the fuel injection flowrate and the ignition timing in response to the above-mentioned signals. Furthermore, the engine control computer 7 receives solenoid signals of the ON-OFF controlled electromagnetic valves S1-S3 from the automatic transmission control computer 8, whereby the engine control computer 7 determines shift timing of the automatic transmission, and carries out the engine torque control by ignition timing control (lag angle control).

Further, the engine control computer 7 receives a signal from a pattern select switch 17 capable of selecting the running pattern, i.e., the fuel consumption performance pattern (economy pattern) or the power performance pattern (power pattern). By this inputted signal, the engine control computer 7 can sense the shift pattern selected by the driver. Furthermore, in a memory of the engine control computer 7, maps of the torque change values for performing the engine torque changes for respective shift patterns are predetermined.

On the other hand, the automatic transmission control computer 8 receives signals from the throttle sensor 12, the vehicle speed sensor 13, the water temperature sensor 14, the brake switch 15, the pattern select switch 17, etc., and further, signals of the position of a shift lever from a shift position sensor 16, permission of an overdrive shifting from an overdrive switch 18, and the like, whereby the electromagnetic valves S1-S3 are ON-OFF controlled, so that a gear stage proportional to the vehicle speed and the accelerator opening can be obtained.

Furthmore, an engine torque control regulating signal is inputted into the automatic transmission control computer 8 from the engine control computer 7, so that the automatic transmission side can detect that the engine 1 has regulated the engine torque control.

FIG. 3 is a flow chart showing the general flow of the integral control of the engine and the automatic transmission.

The engine control computer 7 detects generation of a shifting (shift command) through a change in signal of the electromagnetic valves S1-S3 (Step 122). Thereafter in Step 124, the actual start of the shifting is determined at a time when the engine rotary speed is changed (for example, when it is an upshift, the engine rotary speed is lowered). A lag angle control is started in accordance with a lag angle value predetermined by the type of shifting, a throttle opening and the like, to thereby reduce the engine torque (Step 126).

As will be described hereunder (with reference to Fig. 4), the maps of the engine torque change values undertaken at Step 126 are varied in accordance with the states of the pattern select switch.

As the shifting advances, and when the engine rotary speed Ne is changed to the engine rotary speed NeA which is obtained by adding a predetermined value N1 to the engine rotary speed NeB at the time of completion of a shifting (the engine rotary speed NeB being obtained from a rotary speed of an output shaft and the gear ratio after shifting), the completion of the shifting is determined (Step 128). Thereafter, the lag angle control is terminated slowly taking a predetermined time, and ignition timing is restored to the normal state (Step 130).

The above-mentioned control will hereunder be described in detail with reference to FIG. 4.

FIG. 4 is the flow chart of the engine control routine. In the engine control main routine, a fuel injection flow rate and an ignition timing are determined (Step 232). Subsequently, whether the engine torque control should be carried out or not, i.e., the need for the engine torque control, is determined (Step 234). Namely, the performing region is determined. When throttle opening is smaller than a predetermined value, when exhaust gas temperature is higher than the predetermined value, and/or when a sensor system for performing engine torque change is in failure for example, it is determined that the engine torque control is no need. When there is no need, the routine proceeds again to Step 232. However, when there is a need, it is determined whether or not the pattern select switch is in the power pattern (Step 236). When the power pattern has been selected, a torque control map for the power pattern is selected (Step 238). When the power pattern has not been selected, i.e., the economy pattern has been selected, a torque control map for the economy pattern is selected (Step 240).

In the respective torque control maps, the torque change values are previously associated with the throttle openings. For the same throttle opening, the torque change value in the economy pattern is set lower than in the power pattern. Sometimes, although a torque change is performed when the transmission is in the power pattern (the torque change value is not zero), a torque change may be not be performed in the economy pattern (the torque change value is zero). Thus, the performing region of engine torque change is also varied in accordance with pattern select switch.

Step 236, 238 and 240 can be changed as follows. Namely, first, a torque control map for power (or economy) pattern is selected, thereafter it is determined whether or not the pattern select switch is in the power pattern, and, only when in the economy (or power) pattern, the selected torque control map is corrected to adapt to economy (or power) pattern.

Incidentally, as parameters for determining the performing region, the type of shifting, engine cooling water temperature and the like, in addition to the throttle opening can be considered. In the case of low throttle opening, and in the case of high gear shifting, the shift shocks are low, such that engine torque change is not imperative. Furthermore, for low engine cooling water temperatures, there is a likelihood of engine misfire, necessitating that the engine torque change be regulated.

Subsequently, the torque control performing routine, namely the routine in FIG. 3 is carried out in accordance with the engine control map thus selected, whereby the engine torque change is performed (Step 242).

The torque change value can be controlled in the respective shift patterns as described above, so that the shift characteristics can be satisfactorily controlled over the entire operating region.

Incidentally, in the embodiment herein described, only two shift patterns can be selected by the pattern select switch, In this case, only two torque control maps are necessary, and the engine torque is controlled without using the memory region so much. However, according to the present invention, the number of the shift patterns need not be limited to two, and may be three or more. In that case, it is apparent that, if the torque control maps are secured for the respective states, then the torque control can be more finely performed.

What is claimed is:

1. A system for integrally controlling an automatic transmission and an engine, having a pattern select switch and wherein engine torque is changed by a predetermined change value during shifting to thereby maintain satisfactory shift characteristics, comprising:
   means for determining at least one of a performing region of the engine torque change and an engine torque change value;
   means for detecting a state of said pattern select swtich; and
   means for correcting at least one of said engine torque change performing region and said engine torque change value in accordance with the state of said pattern select switch.

2. The system as set forth in claim 1, wherein said correcting means is a means for changing maps of the engine torque change values.

3. The systems as set forth in claim 1, further comprising:
   means for detecting engine load,
   wherein said engine load is adopted as a parameter for determining said engine torque change performing region.

4. The system as set forth in claim 1, further comprising:
   means for detecting a type of shifting,
   wherein said type of shifting is adopted as a parameter for determining said engine torque change performing region.

5. The system as set forth in claim 1, further comprising:
   means for detecting engine cooling water temperature,
   wherein said engine cooling water temperature is adopted as a parameter for determining said engine torque change performing region.

* * * * *